US008625722B2

(12) United States Patent
Rouquette

(10) Patent No.: US 8,625,722 B2
(45) Date of Patent: Jan. 7, 2014

(54) GFSK RECEIVER ARCHITECTURE AND METHODOLOGY

(75) Inventor: Robert E. Rouquette, Covington, LA (US)

(73) Assignee: Sensus USA Inc., Raleigh, NC (US)

( * ) Notice: Subject to any disclaimer, the term of this patent is extended or adjusted under 35 U.S.C. 154(b) by 387 days.

(21) Appl. No.: 12/847,951

(22) Filed: Jul. 30, 2010

(65) Prior Publication Data
US 2012/0027132 A1 Feb. 2, 2012

(51) Int. Cl.
*H03D 3/00* (2006.01)
*H03D 1/06* (2006.01)

(52) U.S. Cl.
USPC .......................................... 375/334; 375/348

(58) Field of Classification Search
USPC .................. 375/316, 334, 340–341, 346, 350
See application file for complete search history.

(56) References Cited

U.S. PATENT DOCUMENTS

| | | | |
|---|---|---|---|
| 5,361,276 A * | 11/1994 | Subramanian | 375/150 |
| 5,377,229 A | 12/1994 | Wilson et al. | |
| 6,025,758 A | 2/2000 | Lu | |
| 6,272,681 B1 * | 8/2001 | Henderson | 725/126 |
| 6,345,076 B1 | 2/2002 | Petersen et al. | |
| 6,438,176 B1 | 8/2002 | Haran et al. | |
| 6,487,240 B1 * | 11/2002 | Chen | 375/219 |
| 6,628,728 B1 * | 9/2003 | McCarty, Jr. | 375/296 |
| 6,674,812 B1 * | 1/2004 | Stevenson | 375/302 |
| 7,295,630 B2 | 11/2007 | Payne et al. | |
| 7,376,207 B2 | 5/2008 | Chen | |
| 7,403,752 B2 | 7/2008 | Raghavan et al. | |
| 7,542,520 B1 | 6/2009 | Estrada | |
| 8,259,862 B2 * | 9/2012 | Peng et al. | 375/334 |
| 2003/0002600 A1 * | 1/2003 | Twu et al. | 375/334 |
| 2007/0047669 A1 | 3/2007 | Mak et al. | |
| 2008/0031126 A1 | 2/2008 | Feher | |
| 2008/0049871 A1 | 2/2008 | Yang et al. | |
| 2009/0285276 A1 * | 11/2009 | Heikkila | 375/232 |

OTHER PUBLICATIONS

International Search Report and Written Opinion of the international Searching Authority issued Aug. 19, 2011, in PCT/US11/34974.
Mitra, Sanjit K. and Kaiser, James F., "Handbook for Digital Signal Processing," Chapters 4, 6, and 8; 1993.
Proakis, John G., "Digital Communications," Fourth Edition, Chapters 9 and 10; 2001.
Interim European Telecommunication Standard, "European digital cellular telecommunications system (phase 1); Modulation," Mar. 1992.

* cited by examiner

*Primary Examiner* — Khanh C Tran
(74) *Attorney, Agent, or Firm* — Oblon, Spivak, McClelland, Maier & Neustadt, L.L.P.

(57) ABSTRACT

A Gaussian Frequency Shift Key (GFSK) receiver includes a receiver front end to receive a GFSK-modulated signal and convert the received GFSK-modulated signal to a baseband frequency modulated signal, a channel filter to reduce channel interference which is adjacent to a desired channel of the baseband frequency modulated signal, a demodulator to demodulate the channel filtered baseband modulated signal and to recover a sequence of symbols, a digital filter to reduce inter-symbol interference (ISI) from the sequence of symbols, a slicer to produce symbol decisions based on the filtered sequence of symbols, and a symbol-to-bit mapper to map the symbol decisions to data bits.

22 Claims, 13 Drawing Sheets

GFSK RECEIVER ARCHITECTURE AND METHODOLOGY

BACKGROUND OF THE INVENTION

1. Field of the Invention

The present disclosure is related to the field of communications and, specifically, to the field of data communication by Frequency Shift Keying (FSK) modulation.

Gaussian Frequency Shift Keying (GFSK) is a bandwidth-efficient type of FSK digital modulation. Specifically, GFSK modulation utilizes a pulse shaping Gaussian filter to reduce the bandwidth of a modulated transmission carrier. In FSK modulation, a data symbol sequence having sharp transitions results in a modulated transmission carrier having discontinuities in frequency. The frequency discontinuities result in a transmission carrier of wide bandwidth. Smoothing the sharp transitions of the data symbol sequence, however, using a pulse shaping Gaussian filter, circumvents this problem. The pulse shaping Gaussian filter removes the higher frequency components in the data symbol sequence which, in turn, permits a more compact transmission spectrum.

The compact transmission spectrum facilitated by the GFSK modulation scheme aides wireless communication systems which operate in both licensed bands and the unlicensed industrial, scientific, and medical (ISM) bands, by reducing the spectral bandwidth and out-of-band spectrum of the GFSK transmission carrier, to meet FCC adjacent channel power rejection requirements. Similar requirements are enforced by international radio spectrum regulatory bodies.

However, pulse shaping by the pulse shaping Gaussian filter induces inter-symbol interference (ISI). In fact, it is the pulse shaping by the Gaussian filter which introduces the ISI. Consequently, systems designed around the GFSK modulation scheme are designed in view of low data throughput or increased bit error rate. Conventionally, the ISI associated with the GFSK modulation scheme prohibits data communication at high modulation orders, where multiple bits of data are transmitted per symbol. In an attempt to facilitate GFSK communications systems with higher data throughput, the use of more complex and expensive receiver structures have been proposed.

2. Discussion of the Related Background Art

As illustrated at FIG. 1, a first related art GFSK system 100 includes a GFSK transmitter 102 and a GFSK receiver 114.

The GFSK transmitter 102 includes a data source 104, Gaussian filter 106, an FSK modulator 108, a transmitter back end 110, and a transmission antenna 112. The Gaussian filter 106 filters a data symbol sequence provided from data source 104, and outputs a pulse-shaped data symbol sequence to the FSK modulator 108. The FSK modulator 108 modulates a carrier frequency based on the pulse-shaped data symbol sequence, according to a selected FSK modulation order (i.e., a number of bits per symbol). The output of the FSK modulator 108 is provided to the transmitter back end 110, where it is up-converted to a transmission frequency and coupled to the transmission antenna 112 for radio-frequency (RF) transmission. Accordingly, the transmission antenna 112 transmits a GFSK modulated transmission carrier.

The GFSK receiver 114 includes a reception antenna 116, a receiver front end 118, a channel filter 120, a discriminator 122, a post detection filter 124, a symbol slicer 126, and a data sink 128. In operation, the reception antenna 116 and receiver front end 118 receive a transmitted GFSK modulated signal and down-convert the received GFSK modulated signal to baseband. The channel filter 120 selectively filters the received baseband GFSK modulated signal to reject adjacent channel interference and Additive White Gaussian Noise (AWGN). The discriminator 122 performs frequency demodulation by providing an output signal that is proportional to the instantaneous frequency of the modulated transmission carrier and outputs a demodulated sequence of symbols. Specifically, in the case of a 1 bit/symbol modulation order (i.e., 2-GFSK), the discriminator 122 discriminates between two frequencies, $f_0+f_1$ and $f_0-f_1$, where $f_0$ is the un-modulated carrier frequency. The post detection filter 124 filters the demodulated sequence of symbols produced by the discriminator 122 to reduce noise amplified by the discriminator 122. The slicer 126 produces symbol decisions based on the filtered sequence of symbols output from the post detection filter 124, to produce a sequence of symbol decisions, which is provided to the data sink 128. In the GFSK receiver 114, the post detection filter 124 is not designed to remove ISI, and the slicer 126 is required to produce symbol decisions in the presence of ISI, causing symbol and bit errors to occur.

In the first related art GFSK system 100, the ISI introduced by the Gaussian filter 106 requires that a modulation scheme of low modulation order (i.e., few bits/symbol) be used by the FSK modulator 108. Otherwise, unacceptable levels of symbol and bit errors will occur at the GFSK receiver 114. Specifically, the ISI introduced by the Gaussian filter 106 causes the "eye" of the demodulated symbol sequence output by the discriminator 122 to close, and, thus, the slicer 126 will produce erroneous symbol decisions, as the output of the discriminator 122 will fail to be consistently above or below symbol decision threshold(s) of the slicer 126 with certainty at determined symbol timings. At higher modulation orders, it becomes even more difficult for the discriminator 122 and the slicer 126 to produce correct symbol decisions. Therefore, the data throughput of the first related art GFSK system 100 is limited because of the ISI introduced by the Gaussian filter 106, as only lower order modulation schemes may be utilized without unacceptable levels of symbol errors. The channel filter 120 also contributes to the introduction of ISI in the received signal, further compounding the limitations of the GFSK system 100.

As illustrated at FIG. 2, a second related art GFSK system 200 includes a GFSK transmitter 202 and a GFSK receiver 214.

The GFSK transmitter 202 includes a data source 204, a Gaussian filter 206, an FSK modulator 208, a transmitter back end 110, and a transmission antenna 212. The GFSK transmitter 202 operates the same as the first related art GFSK transmitter 102.

The GFSK receiver 214 includes a reception antenna 216, a receiver front end 218, a channel filter 220, a discriminator 222, a maximum likelihood sequence estimator (MLSE) 224, and a data sink 226. As compared to the first related art GFSK receiver 114, the second related art GFSK receiver 214 relies upon the MLSE estimator 224 to produce symbol decisions in the presence of ISI. That is, the MLSE estimator 224 does not remove the ISI. Instead, the MLSE estimator 224 estimates data symbols according to a least probability of errors, in the presence of the ISI, and outputs data bits in terms of error probability. For example, the MLSE estimator 224 may utilize the Vitrerbi algorithm for determining a symbol decision of lowest error probability, attempting to mitigate the presence of the ISI. However, especially at low signal-to-noise ratios (SNR), MLSE estimators cannot adequately mitigate symbol errors due to ISI.

BRIEF SUMMARY OF THE INVENTION

Accordingly, an object of this invention is to provide a communications receiver, communications receiver method, and computer readable storage medium storing thereon computer readable instructions which present a simple and cost-effective approach to communicate data at high throughput even in a low SNR environment.

According to one aspect of this invention, there is provided a communications receiver which includes a receiver front end to receive a modulated signal and convert the modulated signal to a baseband modulated signal, a channel filter to reduce channel interference which is adjacent to a desired channel of the baseband modulated signal from the baseband modulated signal and to produce a channel filtered baseband modulated signal, a demodulator to demodulate the channel filtered baseband modulated signal and to recover a sequence of symbols, a digital filter to reduce inter-symbol interference from the sequence of symbols, a slicer to produce symbol decisions based on the filtered sequence of symbols, and a symbol-to-bit mapper to map the symbol decisions to data bits.

According to another aspect of this invention, there is provided a communications receiver method which includes receiving a modulated signal and converting the modulated signal to a baseband modulated signal, filtering channel interference which is adjacent to a desired channel of the baseband modulated signal to reduce the channel interference from the baseband modulated signal and to produce a channel filtered baseband modulated signal, demodulating the channel filtered baseband modulated signal to recover a sequence of symbols, filtering, by a processor of a data processing apparatus, the sequence of symbols to reduce inter-symbol interference from the sequence of symbols, producing symbol decisions based on the filtered sequence of symbols, and mapping the symbol decisions to data bits.

According to a further aspect of this invention, there is provided a computer readable storage medium storing computer readable instructions which, when executed by a processor of a communications receiver, direct the processor to perform receiving a modulated signal and converting the modulated signal to a baseband modulated signal, filtering channel interference which is adjacent to a desired channel of the baseband modulated signal to reduce the channel interference from the baseband modulated signal and to produce a channel filtered baseband modulated signal, demodulating the channel filtered baseband modulated signal to recover a sequence of symbols, filtering the sequence of symbols to reduce inter-symbol interference (ISI) from the sequence of symbols, producing symbol decisions based on the filtered sequence of symbols, and mapping the symbol decisions to data bits.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention is directed to a communications receiver and a communications receiver method to substantially reduce and largely remove ISI introduced by pulse shaping Gaussian filters of GFSK transmitters, so that higher modulation orders of FSK may be utilized to increase data throughput.

The disclosed receiver and receiver method permit the use of Gaussian filters which more aggressively pulse shape symbol sequences, as compared to filters conventionally used, to mitigate and substantially remove frequency discontinuities and to reduce occupied transmission bandwidth. Additionally, the disclosed receiver and receiver method permit higher FSK modulation orders to be used, while the higher-order modulated symbol sequences are more aggressively pulse shaped. Thus, the disclosed receiver and receiver method achieve increased data throughput while reducing the occupied transmission bandwidth. These and other advantages are achieved by a GFSK receiver including a filter which accounts for and removes ISI induced by pulse shaping Gaussian filters of GFSK transmitters.

Additionally, the disclosed receiver and receiver method substantially reduce and largely remove ISI introduced by transmitter modulators, receiver demodulators, and receiver channel filters.

Further, the disclosed receiver and receiver method provide a communication system incorporating the known advantages of GFSK modulation while reducing the processing stages of conventional GFSK receivers to arrive at a simpler, more efficient, and cost effective GFSK receiver.

The removal of ISI based on the receiver and receiver method of the present invention is not limited to GFSK communication systems, but may be used to remove ISI and other undesirable communication artifacts from communication systems other than GFSK communications systems, both wired and wireless.

An embodiment of a GFSK communications system which achieves the above-described advantages will now be described with reference to FIG. 3.

Figure 1:
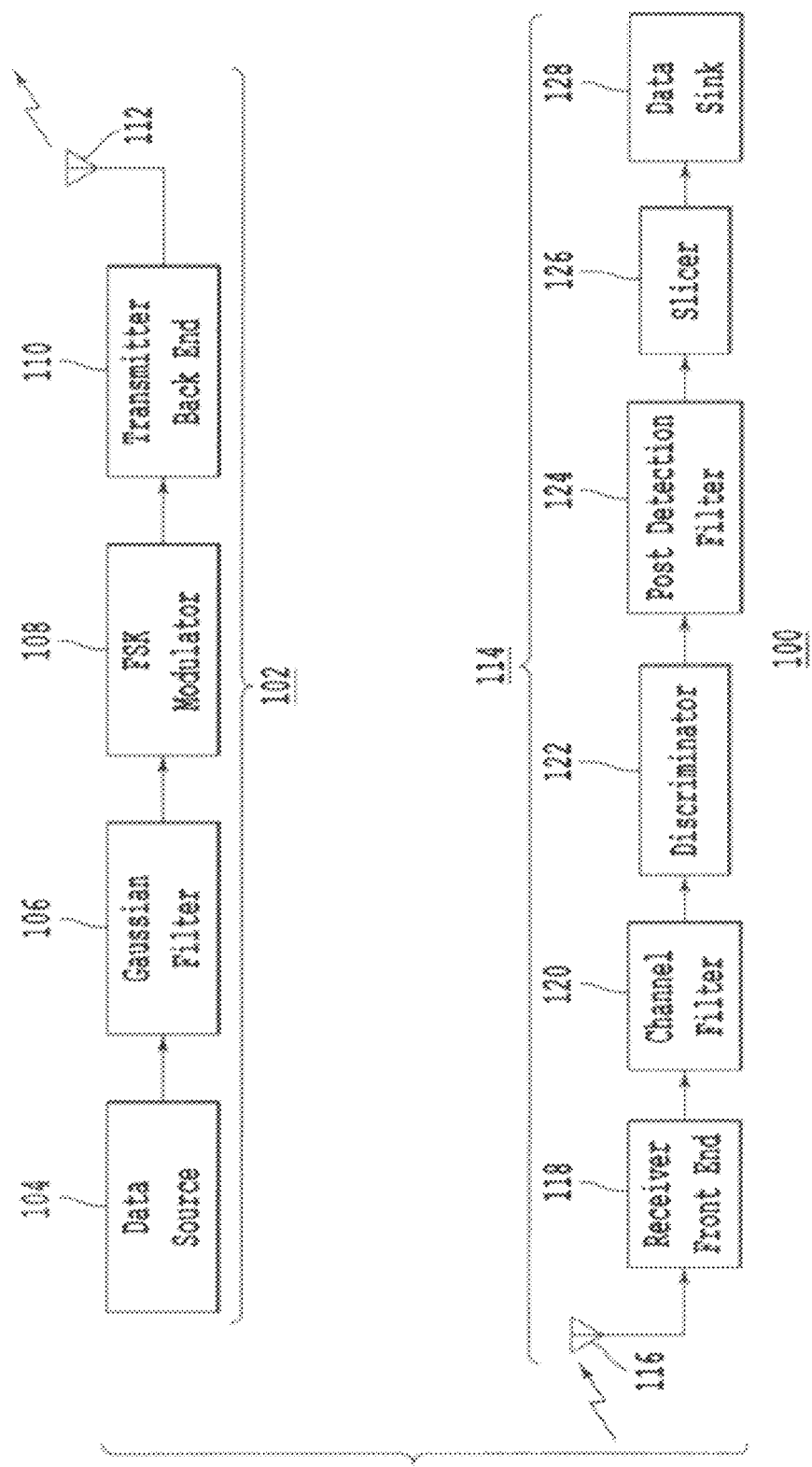
FIG. 1 illustrates a first background art GFSK communication system.
Figure 2:
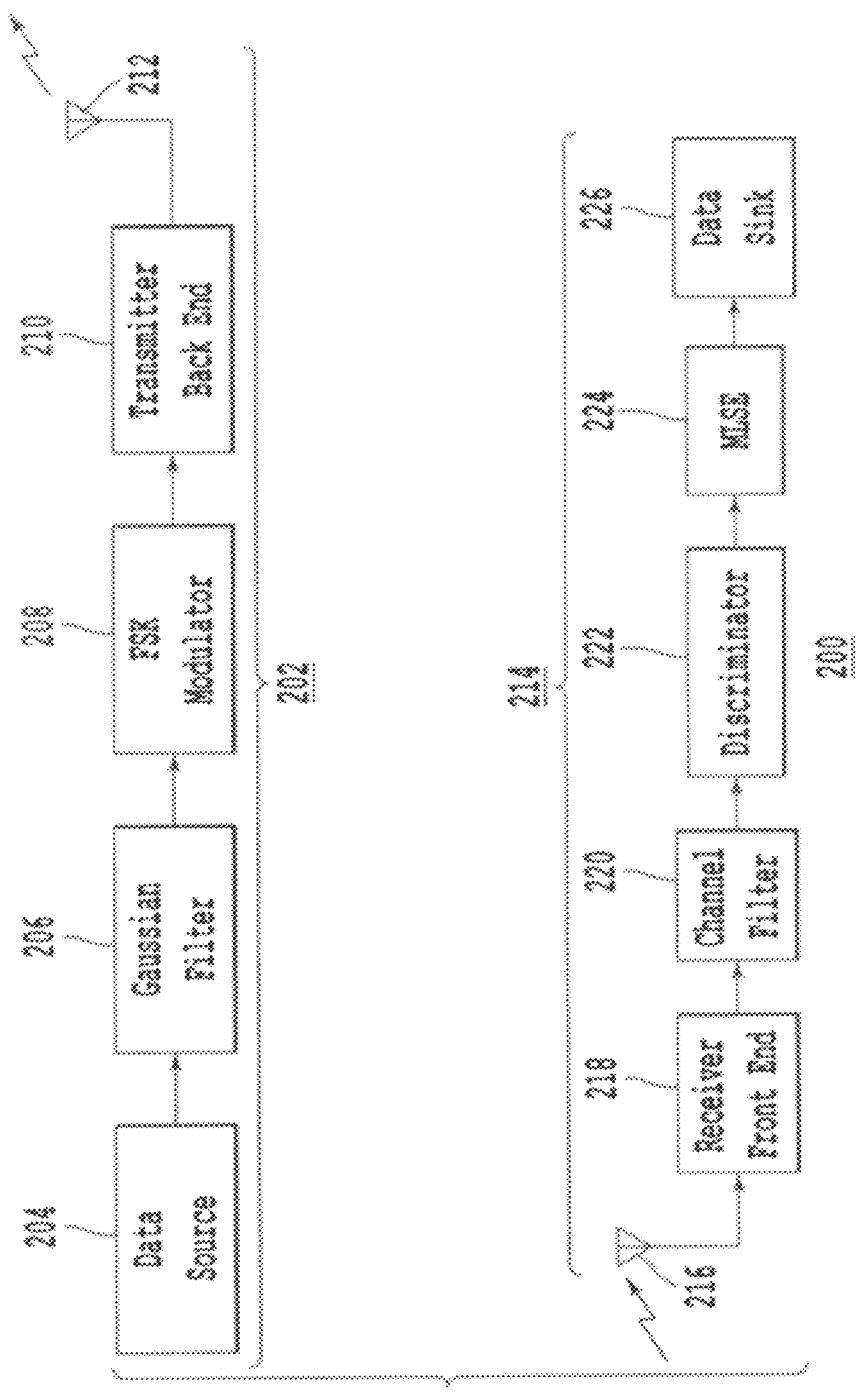
FIG. 2 illustrates a second background art GFSK communication system.
Figure 3:
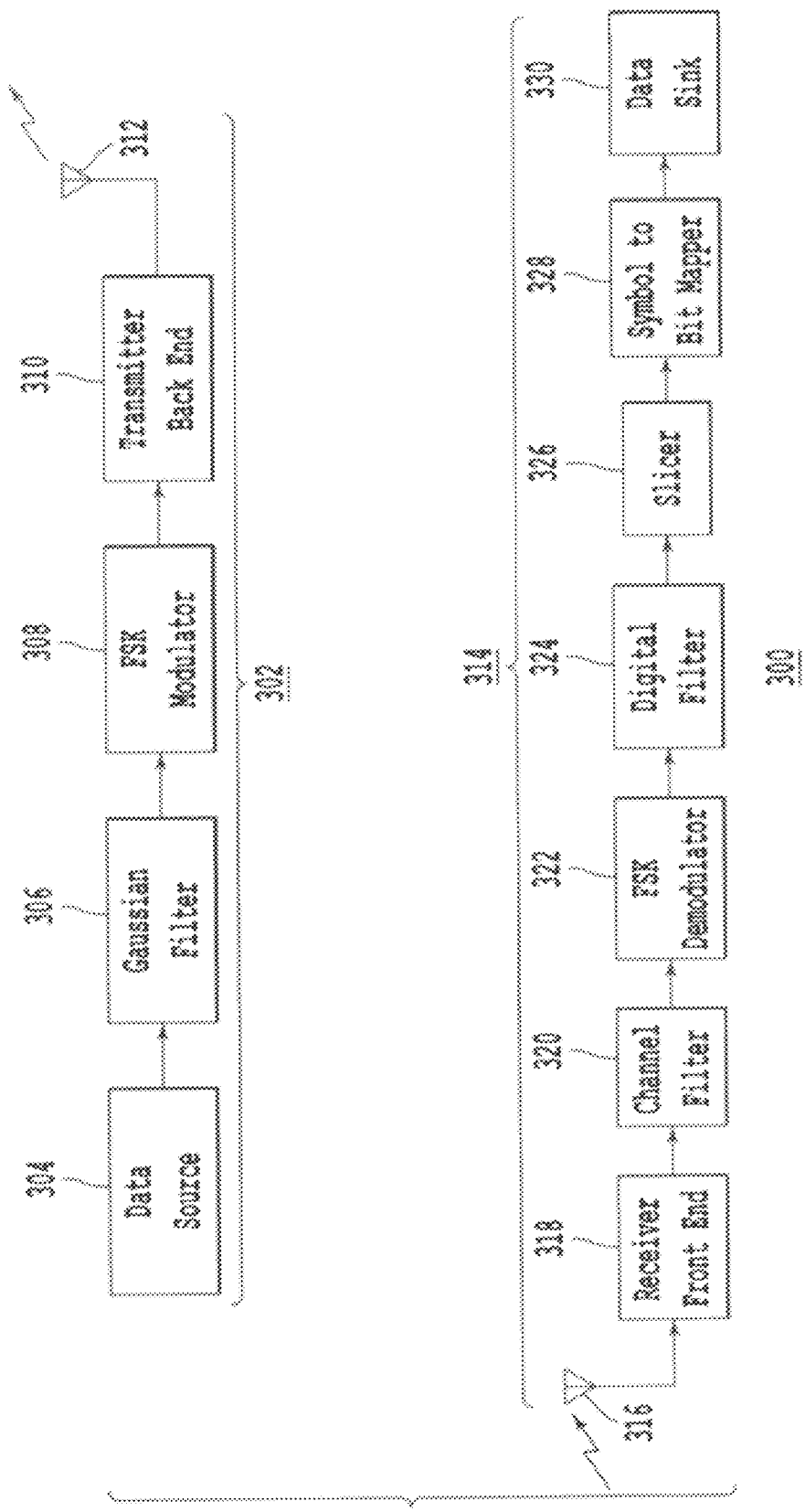
FIG. 3 is a block diagram of a GFSK communication system.

FIG. 3 illustrates a GFSK communication system 300. The GFSK communication system 300 includes a GFSK transmitter 302 and a GFSK receiver 314. The GFSK transmitter 302 and the GFSK receiver 314 may be combined in a single communications unit as an integrated GFSK transceiver or may be provided as separate communication units.

The GFSK transmitter 302 includes a data source 304, a Gaussian filter 306, an FSK modulator 308, a transmitter back end 310, and a transmission antenna 312. The Gaussian filter 306 filters a sequence of symbols provided from data source 304, and outputs a pulse-shaped sequence of symbols to the FSK modulator 308. The FSK modulator 308 modulates a frequency $f_0$ based on the pulse-shaped sequence of symbols, according to a selected FSK modulation order m (i.e., a number of bits per symbol). The output of the FSK modulator 308 is provided to the transmitter back end 310, where it is up-converted to a transmission frequency and coupled to the transmission antenna 312 for wireless RF transmission. The transmission antenna 312 transmits a GFSK modulated transmission signal at the transmission frequency.

Embodiments of the data source 304 may include a Forward Error Correction (FEC) code generator which adds redundant data to the sequence of symbols, so that a GFSK receiver can correct errors without re-transmission of data using an FEC decoder.

Figure 4:
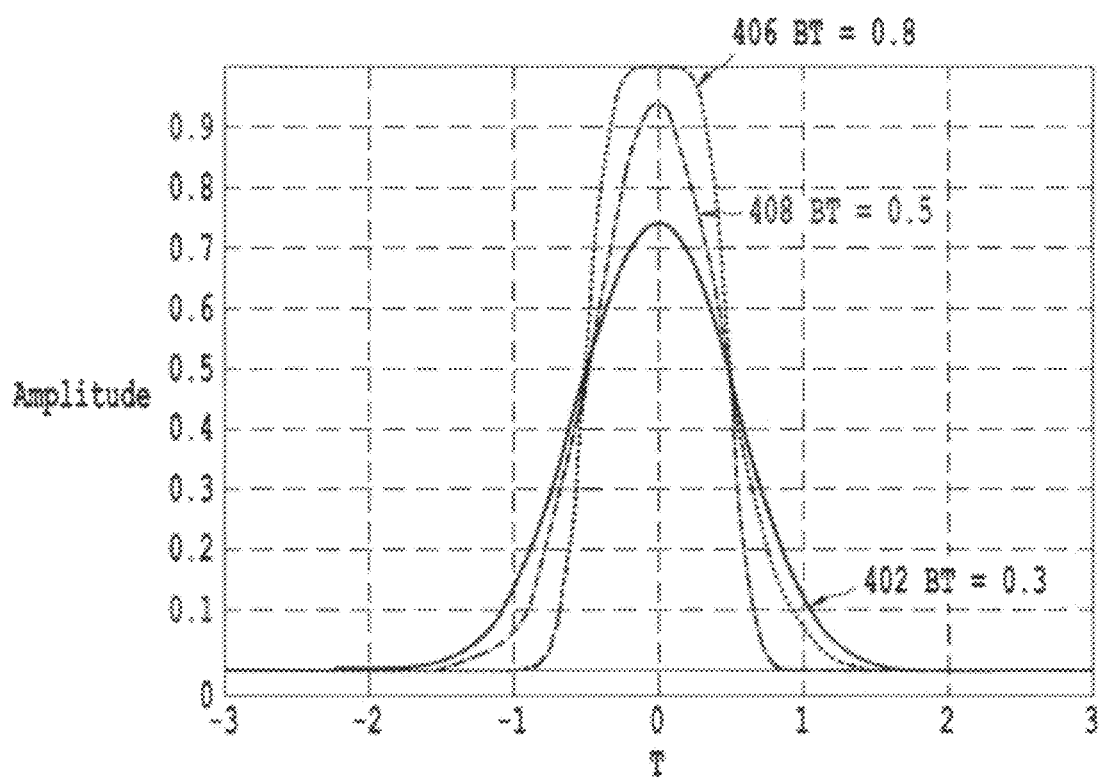
FIG. 4 is a graph illustrating filter response waveforms of Gaussian filters having various BT products.

With reference to FIG. 4, the pulse shaping characteristics of the Gaussian filter 306 are described. The response of the Gaussian filter 306 is described in terms of its BT product, where B is the −3 dB half-bandwidth of the filter and T is the symbol period (i.e., $1/f_{symbol\ rate}$) of an input symbol. FIG. 4 illustrates the impulse response of Gaussian filters of BT=0.3, 0.5, and 0.8, as convoluted with a rectangular impulse waveform of time period T and unit amplitude. The impulse responses of Gaussian filters of BT=0.3, 0.5, and 0.8 are illustrated, respectively, as output response waveforms 402, 404, and 406.

In FIG. 4, the vertical or y-axis represents the amplitude of the impulse responses, and the horizontal or x-axis represents the symbol time base T.

As illustrated at FIG. 4, for lower values of the BT product, the output response waveforms 406, 404, and 402 become progressively more spread over the symbol time period T, representing increased introduction of ISI between data symbols. Specifically, any output response waveform having a duration greater than the symbol period T corresponds to a Gaussian filter having a BT product which results in the introduction of ISI among symbols when provided with a sequence of the symbols at its input. As illustrated, ISI among five symbol periods approaches for a BT of approximately 0.3.

In GFSK communications systems, Gaussian filters having low BT product values, although introducing significant amounts of ISI, result in modulated transmission carriers of more compact and efficient bandwidth, which is preferable. Specifically, frequency discontinuities in a modulated transmission carrier, which cause the transmission bandwidth of the modulated transmission carrier to be undesirably wide, are removed by the use of Gaussian filters in a GFSK communication system. The lower the BT product of a Gaussian filter, the better the removal of frequency discontinuities.

In preferred embodiments, the use of pulse shaping Gaussian filters having low BT products, such as 0.36 or lower, is possible because of a GFSK receiver filter described below. Thus, in the preferred embodiment, the Gaussian filter 306 has a BT product of 0.36.

Referring back to FIG. 3, the FSK modulator 308 modulates a carrier $f_0$ based upon a modulation index h and the selected FSK modulation order m.

For FSK modulation at the selected FSK modulation order m, the modulation index h is defined as:

$$h = \Delta f_m / f_{symbol\ rate} \quad (1)$$

where $f_{symbol\ rate}$ is the symbol rate and $\Delta f_m$ is the frequency spacing of adjacent symbols. Thus, the modulation index h indicates how much a modulated carrier varies from its unmodulated frequency, $f_0$. The modulation index h is also related to an amount of bandwidth a modulated FSK carrier occupies. A lower modulation index h relates to a smaller occupied frequency bandwidth, and a larger modulation index h relates to a larger occupied frequency bandwidth. The susceptibility of a GFSK receiver to make erroneous symbol decisions increases as the modulation index, h, decreases.

The FSK modulator 308 of the GFSK receiver 314 may operate at relatively high modulation orders, m, and at relatively low modulation indexes, h, as compared to those conventionally used. For example, the FSK modulator 308 may operate at modulation orders such as 2-GFSK, 4-GFSK, 8-GFSK, and 16-GFSK, and embodiments may utilize odd modulation orders and modulation orders as high as 256-GFSK or higher. Also the FSK modulator 308 may operate at modulation indexes, h, as low as 1/256.

Embodiments are not limited to utilizing FSK modulation, however, and the FSK modulator 308 may be implemented by a Phase Shift Key (PSK) modulator, a Quadrature Amplitude (QAM) modulator, or equivalents thereof.

Figure 5:
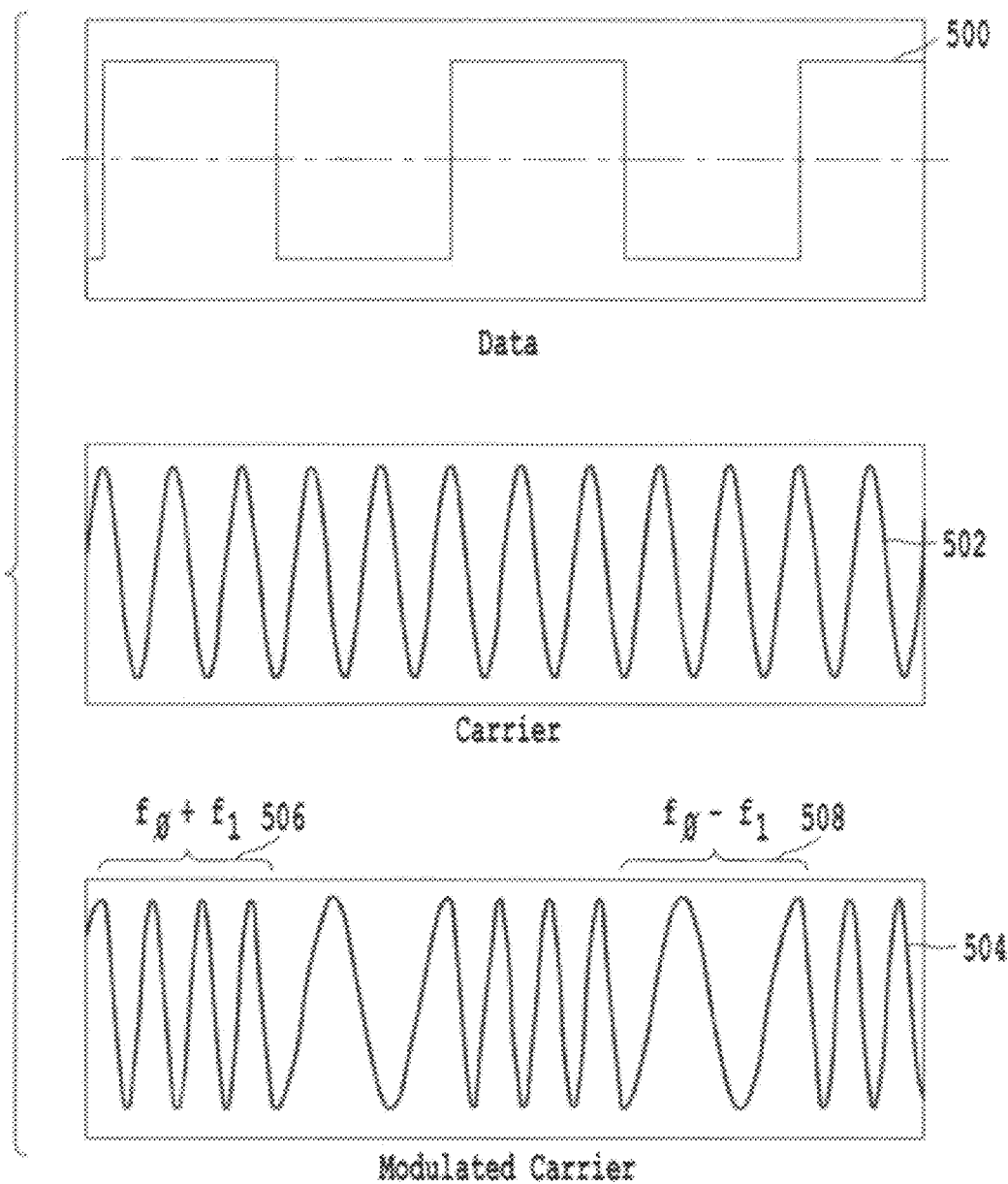
FIG. 5 is a waveform diagram illustrating an FSK modulated waveform.

The 2-GFSK modulation order relates to the transmission of 1 bit/symbol. Thus, when operating under a 2-GFSK modulation order, the FSK modulator 308 modulates a frequency $f_0$ by offset frequencies $+/-f_1$, to arrive at two modulation symbols, $f_0+f_1$ and $f_0-f_1$. With reference to FIG. 5, a data symbol sequence 500, an un-modulated carrier 502, and a modulated carrier 504 are illustrated. As compared to the unmodulated carrier 502, the modulated carrier 504 depicts a first FSK symbol 506, at a frequency $f_0+f_1$, and a second FSK symbol 508, at a frequency $f_0-f_1$.

In FIG. 5, the vertical or y-axis represents amplitude, and the horizontal or x-axis represents time.

Further, the modulation orders of 4-GFSK, 8-GFSK, and 16-GFSK are based upon an extension of 2-GFSK using additional multiples of the offset frequency $f_1$. That is, for 4-GFSK, which is a 2 bit/symbol modulation order, the FSK modulator 308 relies on four modulation symbols, $f_0+f_1$, $f_0-f_1$, $f_0+3f_1$, and $f_0-3f_1$.

Referring back to FIG. 3, transmitter back end 310 up-converts the modulated carrier output from the FSK modulator 308 to a frequency suitable for RF transmission.

The transmitter back end 310 includes hardware circuit components necessary to up-convert the frequency modulated carrier $f_0$ to the frequency suitable for RF transmission. As part of a non-limiting group of hardware components, the transmitter back end 310 may include Digital-to-Analog Converters (DACs), Voltage Controlled Oscillators (VCO), Phase Locked Loops (PLLs), mixers, analog filters, Low Noise Amplifiers (LNAs), and other hardware components recognized as being used to up-convert a modulated carrier to a frequency suitable for RF transmission.

As discussed above, GFSK modulated transmission carriers of more compact and efficient bandwidth advantageously permit operation of GFSK transmitters in both licensed bands and the unlicensed ISM bands, by providing a transmission signal which conforms to FCC adjacent channel interference regulations. Further, GFSK modulated transmission carriers of more compact and efficient bandwidth advantageously permit the selection of transmission amplifiers which are simple and cost effective. Thus, because the transmission back end 310 transmits a modulated transmission carrier of compact bandwidth, as facilitated by the pulse shaping Gaussian filter 306, the transmission back end 310 may be designed using a class of amplifiers which are simple, cost effective, and efficient.

After up-conversion by the transmitter back end 310, a GFSK modulated transmission carrier signal is transmitted from transmission antenna 312.

Embodiments of the GFSK transmitter 302 may be implemented entirely in hardware as a combination of hardware circuits. Alternatively, the GFSK transmitter 302 may be implemented in a combination of hardware and software. For example, the data source 304, the Gaussian filter 306, and the FSK modulator 308 may be implemented by a processor of a data processing apparatus executing computer readable instructions stored in a computer readable medium while the transmitter back end 310 and the transmission antenna 312 may be implemented in hardware as a combination of hardware circuits.

Referring back to the GFSK communication system 300 of FIG. 3, the GFSK receiver 314 includes a reception antenna 316, a receiver front end 318, a channel filter 320, an FSK demodulator 322, a digital filter 324, a slicer 326, a symbol to bit mapper 328, and a data sink 330.

The GFSK receiver 314 receives a GFSK modulated transmission carrier signal, such as the GFSK modulated transmission carrier signal transmitted by the GFSK transmitter 302, at antenna 316, and down-converts the received GFSK modulated transmission carrier signal at the receiver front end 318 to a baseband frequency modulated signal.

The receiver front end 318 includes hardware circuit components necessary to down-convert the received GFSK modulated transmission carrier signal to baseband. As part of a non-limiting group of hardware components, the receiver front end 318 may include Analog-to-Digital Converters (ADCs), Voltage Controlled Oscillators (VCO), Phase Locked Loops (PLLs), mixers, analog filters, Low Noise Amplifiers (LNAs), and other hardware components recognized as being used to down-convert a received transmission carrier signal.

The channel filter 320 selectively reduces adjacent channel interference adjacent to a desired channel of the baseband frequency modulated signal from the baseband modulated signal and produces a channel filtered baseband modulated signal. In particular, the channel filter 320 reduces frequencies other than the transmission carrier frequency. However, as the BT of the channel filter 320 decreases, the channel filter 320 induces additional ISI in the received signal, as it reduces the adjacent channel interference. The channel filter 320 may have a BT product of 0.75, 0.6, 0.5, or lower. As compared to channel filters used in conventional GFSK receivers, the channel filter 320 may more aggressively pursue the reduction of adjacent channel interference by using a filter with a lower BT product, and the additional ISI may be substantially reduced and largely removed by the digital filter 324.

The FSK frequency demodulator 322 demodulates the channel filtered baseband frequency modulated signal, to recover a sequence of symbols. That is, depending upon the modulation order, m, used to modulate the GFSK modulated transmission carrier signal, the FSK frequency demodulator 322 may distinguish between the frequency $f_0$ offset in frequency by multiples (i.e., $f_1$, $3f_1$, $5f_1$, $7f_1$, etc.) of offset frequency $f_1$. For example, in the case of a 1 bit/symbol modulation order (i.e., 2-GFSK), the frequency demodulator 322 discriminates between the two frequencies $f_0+f_1$ and $f_0-f_1$, whereto is the carrier frequency, to produce an output signal. In the case of 2-GFSK, $f_0+f_1$ may relate to a demodulated logic "1" and $f_0-f_1$ may relate to a demodulated logic "0". Further modulation orders, such as 4-GFSK, 8-GFSK, and 16-GFSK may be realized based upon additional multiples of offset frequency $f_1$, as described above.

The FSK frequency demodulator 322 may be realized by any frequency demodulator providing an output proportional to the instantaneous frequency at its input. To achieve high fidelity for higher modulation orders, the preferred embodiment of the FSK frequency demodulator 322 includes a digital signal processor (DSP) frequency demodulator that performs $d\theta/dt$ in a bandwidth wider than the channel filter 320, where $\theta$ is instantaneous phase at the input of the FSK frequency demodulator 322. The FSK frequency demodulator 322 outputs a recovered sequence of symbols.

The recovered sequence of symbols output from the FSK frequency demodulator 322 is subject to ISI. The ISI is substantially caused by a pulse shaping Gaussian filter of the transmitter which transmitted the GFSK modulated transmission carrier signal, such as the pulse shaping Gaussian filter 306 of the GFSK transmitter 302. Because the recovered sequence of symbols output from the FSK frequency demodulator 322 is subject to ISI, the "eye" of the recovered sequence of symbols collapses. To remove the ISI, the demodulated data output signal is filtered by the digital filter 324 to remove the ISI, before symbol decisions are made by the slicer 326. Thus, the digital filter 324 opens the "eye" of the recovered sequence of symbols output from the FSK frequency demodulator 322, so that symbol decisions made by the slicer 326 are made with less error, even at high modulation orders, m, and low SNR. The digital filter 324 substantially reduces and largely removes ISI based on a plurality of coefficients. The digital filter 324 also performs filtering similar to the filtering performed by the post detection filter 124 based on the plurality of coefficients.

A technique for determining the plurality of coefficients is described in association with FIG. 6 below, and the structure and operation of the digital filter 324 is describe in association with FIG. 8 below. Because the digital filter 324 removes ISI and also performs post detection filtering, the GFSK receiver 314 is designed to be at least as simple and as cost effective as conventional GFSK communication systems, but with better performance.

Referring back to FIG. 3, the slicer 326 produces symbol decisions based on the sequence of symbols filtered by the digital filter 324. Based on the filtered sequence of symbols, the slicer 326 is capable of distinguishing among several FSK symbols, without error. Thus, the use of the digital filter 324 permits the FSK modulator 308 of the GFSK transmitter 302 to operate based on modulation orders which are higher than those conventionally used. Thus, data throughput is increased. Data throughput is also increased due to the removal of ISI by the digital filter 324, because the slicer 326 is able to make symbol decisions with less error, which results in fewer re-transmissions.

After symbol decisions are produced by the slicer 326, the symbol-to-bit mapper 328 maps the symbol decisions to data bits. Depending upon the modulation order, m, one symbol input to the symbol-to-bit mapper 328 may correspond to 1, 2, 4, or more data bits. The symbol-to-bit mapper 328 may also map incoming symbols to an odd number of data bits. Further, embodiments of the slicer 326 and/or the symbol-to-bit mapper 328 may include an FEC decoder which uses redundant data to correct errors without re-transmission of the data. Data bits output by the symbol-to-bit mapper 328 are provided to the data sink 330.

Embodiments of the GFSK receiver 314 may be implemented entirely in hardware as a combination of hardware circuits. Alternatively, the GFSK receiver 314 may be implemented in a combination of hardware and software. For example, the reception antenna 316 and the receiver front end 318 may be implemented in hardware as a combination of hardware circuits while the channel filter 320, the FSK demodulator 322, the digital filter 324, the slicer 326, the symbol to bit mapper 328, and the data sink 330 may be implemented by a processor of a data processing apparatus executing computer readable instructions stored in a computer readable medium.

Figure 6:
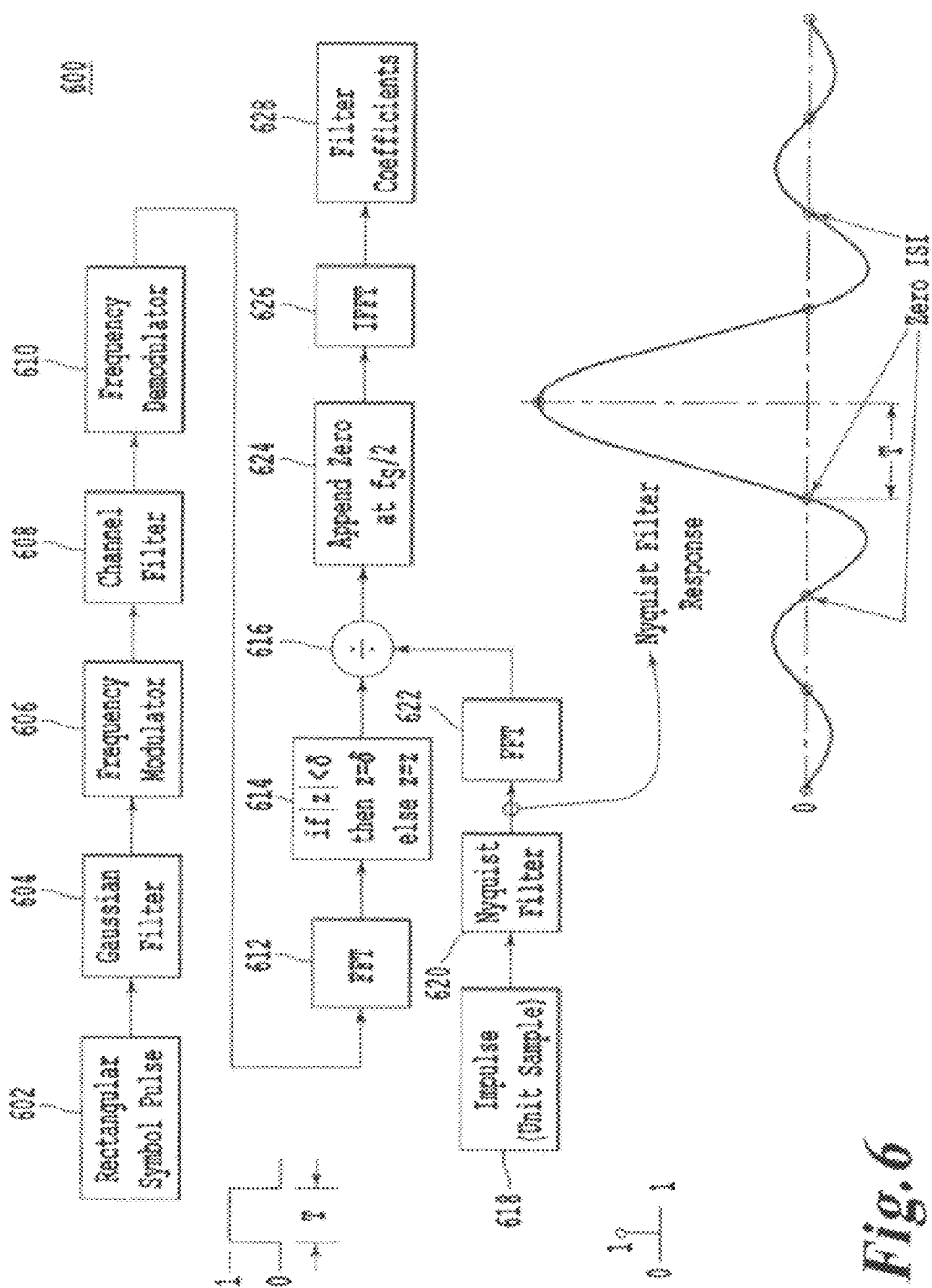
FIG. 6 is a block diagram illustrating the generation of coefficients of a digital filter.

FIG. 6 is a flowchart illustrating an operation 600 for determining a plurality of coefficients. Although FIG. 6 is described with reference to the determination of filter coefficients for the digital filter 324 of the GFSK receiver 314, the operation 600 may be applied for determining coefficients used in digital filters of receivers other than the GFSK receiver 314. Likewise, the operation illustrated at FIG. 6 may be utilized to determine coefficients to be used in the digital filter method 1100.

Referring to FIG. 6, a rectangular impulse of symbol time T is provided at 602. The rectangular impulse is provided to Gaussian filter 604. The output response of the Gaussian filter 604 will vary depending upon the BT product of the Gaussian filter 604, as discussed above with regard to FIG. 4. The Gaussian filter 604 may be varied in BT product to produce digital filter coefficients based upon a Gaussian filter of a particular BT product. In other words, the digital filter coefficients determined according to the operation 600 will vary depending upon at least the BT product of the Gaussian filter 604. In the embodiment of the operation 600 illustrated at FIG. 6, the BT product of the Gaussian filter 604 is 0.36 and the output response of the Gaussian filter 604 extends over a time period of 5T.

The output of the Gaussian filter 604 is provided to a frequency modulator 606, which may be modeled based upon known properties of an FSK modulator, such as the FSK modulator 308. The frequency modulator 606 may be based upon a modulation transfer function of the FSK modulator 308. The digital filter coefficients determined according to the operation 600 will also vary depending upon the modulation transfer function of the frequency modulator 606.

The output of the frequency modulator 606 is provided to the channel filter 608. The channel filter 608 may be varied in BT product, for example, depending upon the BT product of the channel filter 320 of the GFSK receiver 314. The digital filter coefficients determined according to the operation 600 will also vary depending upon the BT product of the channel filter 608.

The output of the channel filter 608 is input to frequency demodulator 610, which may be modeled based upon known properties of an FSK demodulator, such as the FSK demodulator 322. The frequency demodulator 610 may be based upon a modulation transfer function of the FSK demodulator 322. The digital filter coefficients determined according to the operation 600 will also vary depending upon the modulation transfer function of the frequency demodulator 610.

It is noted that the frequency modulator 606, the channel filter 608, and the frequency demodulator 610 may be omitted from the operation 600, particularly if the channel filter 608 is of linear phase type having a BT product of greater than or equal to 0.75 and if the modulation transfer functions of both the frequency modulator 606 and the frequency demodulator 610 are unity. In the preferred embodiment of the operation 600, the BT of the channel filter 608 is 0.75 or less.

Also, a transmitter back end and a receiver front end may be included among the frequency modulator 606, the channel filter 608, and the frequency demodulator 610, so that responses of the transmitter back end and the receiver front end of a communications system may be accounted for in the operation 600.

An output of the frequency demodulator 610 is transformed to the frequency domain by a Fast Fourier Transform (FFT) at 612. The FFT, at 612, outputs a frequency domain representation of an aggregate response (including the response which induces ISI) of the Gaussian filter 604, the frequency modulator 606, the channel filter 608, and the frequency demodulator 610. The frequency domain representation of the aggregate response is included within a plurality of frequency bins which are output from the FFT at 612.

Depending upon whether the frequency modulator 606, the channel filter 608, and the frequency demodulator 610 are included in the operation 600, the aggregate response will vary accordingly. Further, the aggregate response will vary according to whether a transmitter back end and a receiver front end are included in the operation 600.

The magnitudes of each of the plurality of frequency bins output by the FFT 612 are provided to a comparator 614 for comparison with a predetermined value $\delta$. Specifically, a comparison occurs at the comparator 614 such that, if the magnitude of a frequency bin is less than or equal to $\delta$, the frequency bin is set to be equal to $\delta$. Otherwise, the frequency bin is unchanged. After the comparator 614, the updated frequency bins are provided as a divisor to a first input of a divider 616.

The comparison at the comparator 614 prevents noise gain. In the case of the operation 600, the comparison at the comparator 614 prevents noise gain by preventing the divisor of the divider 616 from being too close to 0. The value of $\delta$ has been recognized as a result effective variable for high frequency roll-off of a digital filter which uses the coefficients determined by the operation 600. Specifically, the value of $\delta$ used in the operation 600 may be varied to achieve a digital filter having a desired high roll-off frequency response without deteriorating the Nyquist response of the filter, which is necessary for removing ISI. In the selection of $\delta$ to determine the desired high roll-off frequency of the digital filter, post detection filtering is achieved by the high roll-off response. In this manner, the comparison at the comparator 614 and the selection of $\delta$ imparts the functionality of the post detection filter 124. In the preferred embodiment of the operation 600, the value of $\delta$ was determined empirically to be $5 \times 10^{-3}$, a real number. Other values of $\delta$ may be used depending upon the desired roll-off response as described above.

Continuing with FIG. 6, a unit impulse is provided at 618 to a Nyquist filter 620. As discussed above, the impulse response of a Nyquist filter, such as the Nyquist filter 620, is 0 for all nT, except for n=0, as illustrated at FIG. 6. In the embodiment of the operation 600 illustrated at FIG. 6, the output response of the Nyquist filter 620 extends over a time period of 5T.

The output of the Nyquist filter 620 is transformed to the frequency domain by an FFT 622. The output of the FFT 622 is a plurality of frequency bins, which are provided as a dividend to a second input of the divider 616.

The divider 616 divides the output of the FFT 622 by the output of the comparator 614. After the divider 616, a 0 may be optionally appended to the output of the divider 616 at the Nyquist frequency $f_s/2$, to create an odd number of frequency bins if desired. Having an odd number of frequency bins creates a group delay of the resultant filter which is an integer number of samples. The optional insertion of the 0 occurs between the divider 616 and an Inverse Fast Fourier Transform (IFFT) 626.

The quotient output of the divider 616 represents a measure of the difference between an aggregate response and the impulse response of the Nyquist filter 620, where the aggregate response is a response of: (1) the Gaussian filter 604, (2) the frequency modulator 606, (3) the channel filter 608, and (4) the frequency demodulator 610. The aggregate response may vary depending upon the inclusion or exclusion of the frequency modulator 606, the channel filter 608, and the frequency demodulator 610. As noted above, the frequency demodulator 606, the channel filter 608, and the frequency demodulator 610 may be omitted from the operation 600, particularly if the channel filter 608 is of linear phase type having a BT product of greater than or equal to 0.75 and if the modulation transfer functions of both the frequency modulator 606 and the frequency demodulator 610 are unity.

By generating digital filter coefficients based on the measure of difference output by the divider 616, ISI introduced by the Gaussian filter 604, the frequency modulator 606, the channel filter 608, and the frequency demodulator 610 can be substantially removed using a digital filter including the generated digital filter coefficients.

The output of the divider 616, whether appended with a 0 at the Nyquist frequency $f_s/2$ or not, is provided to the IFFT 626. The IFFT 626 converts the frequency bins output from the divider 616 to a real-output time-domain signal. The output of the IFFT 626 provides digital filter coefficients, as illustrated at 628. The real time-domain output of the IFFT block 626 includes samples for a time period of 5T or a number of samples over the time period 5T plus 1 sample if a 0 is appended to the output of the divider 616.

Using the digital filter coefficients determined by the operation 600, a constant coefficient digital filter for removing ISI may be implemented that converts the response of a communications system including a Gaussian filter into one having a Nyquist response, plus the response of a post detection filter. By removing the ISI caused by Gaussian filters at a receiver, symbol decisions can be made with fewer errors, even at low SNR and when using high modulation orders.

Pursuant to the operation 600, ISI which is attributed to one or more of: (1) Gaussian filters, (2) transmitter modulators, (3) transmitter back ends, (4) receiver front ends, (5) channel filters, and (6) receiver demodulators may be accounted and compensated for. The operation 600 is not limited to accounting and compensating for ISI attributed to the above transmitter and receiver components, however, and one of skill in the art would recognize that ISI attributed to other transmitter and receiver components may be accounted and compensated for.

With reference to the GFSK communication system 300 as an example, ISI attributed to the following components may be accounted and compensated for based on the digital filter coefficients determined by the operation 600: (1) the Gaussian filter 306, (2) the FSK modulator 308, (3) the transmitter back end 310, (4) the receiver front end 318, (5) the channel filter 320, and (6) the FSK demodulator (322).

FIGS. 7A, 7B, 7C, and 7D illustrate the effect of filtering by the digital filter 324. In FIGS. 7A, 7B, 7C, and 7D, the vertical or y-axis represent amplitude, and the horizontal or x-axis represents time.

Figure 7A:
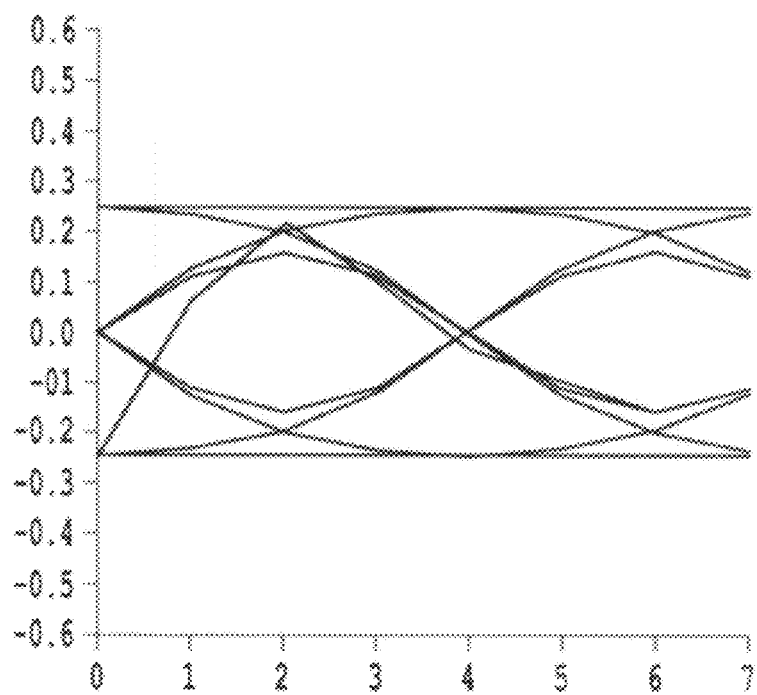
FIG. 7A is a graph illustrating a sequence of symbols demodulated from a received 2-GFSK signal.

FIG. 7A illustrates a sequence of symbols demodulated from a received 2-GFSK signal. As illustrated at FIG. 7A, not every symbol reaches full amplitude for 2-GFSK symbol slicing. Instead, the "eye" of the sequence of symbols is collapsed due to ISI.

Figure 7B:
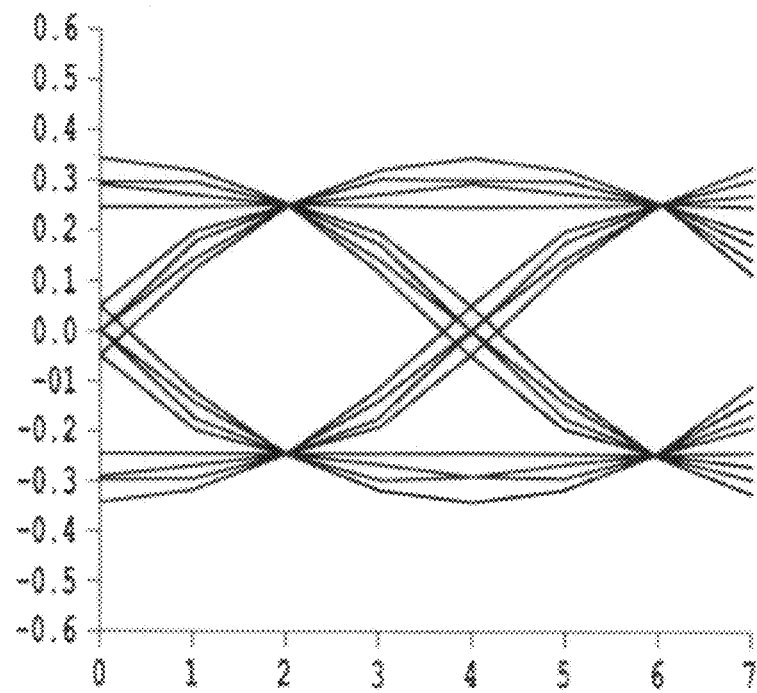
FIG. 7B is a graph illustrating the sequence of symbols of FIG. 7A after filtering.

FIG. 7B illustrates the sequence of symbols of FIG. 7A after filtering by the digital filter 324 pursuant to the digital filter coefficients determined by the operation 600. As illustrated at FIG. 7A, the symbols reach full 2-GFSK symbol amplitude, and the "eye" of the sequence is not collapsed. Thus, FIG. 7B illustrates that ISI has been removed by the digital filter 324 as compared to FIG. 7A.

Figure 7C:
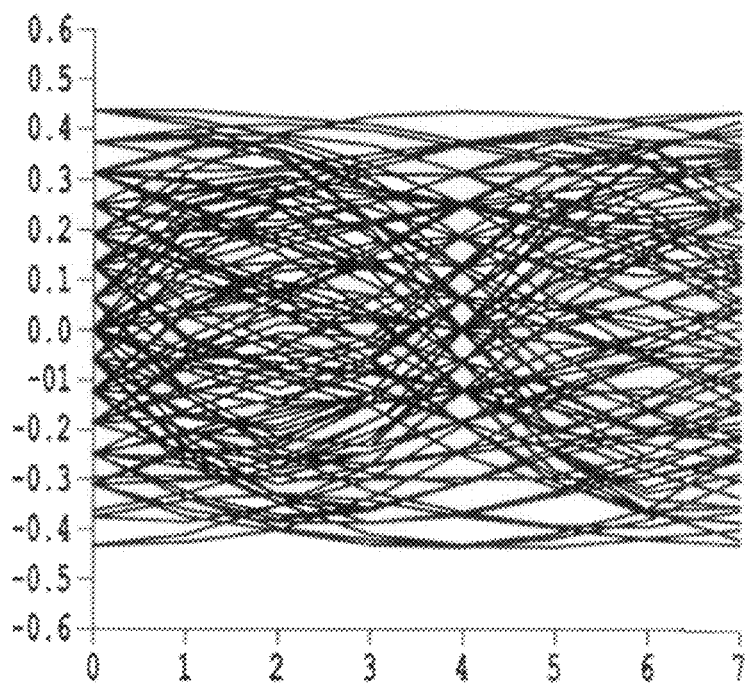
FIG. 7C is a graph illustrating a sequence of symbols demodulated from a received 8-GFSK signal.

As illustrated in FIG. 7C, the collapse of the "eye" of a demodulated sequence of symbols from a received 8-GFSK signal is even more pronounced than in FIG. 7A. As illustrated at FIG. 7C, not every symbol approaches its respective symbol level for 8-GFSK symbol slicing. Instead, the "eye" of the sequence of symbols is collapsed due to ISI.

Figure 7D:
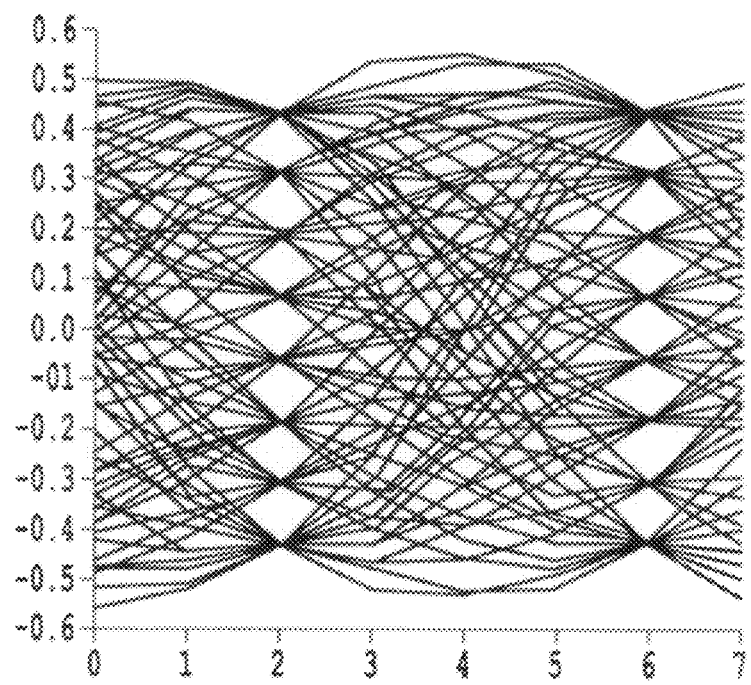
FIG. 7D is a graph illustrating the sequence of symbols of FIG. 7C after filtering.

FIG. 7D illustrates a sequence of symbols of FIG. 7C after filtering by the digital filter 324 pursuant to the digital filter coefficients determined by the operation 600. As illustrated at FIG. 7D, the symbols reach their respective 8-GFSK symbol levels, and the "eye" of the sequence is not collapsed. Thus, FIG. 7D illustrates that ISI has been removed by the digital filter 324 as compared to FIG. 7C.

As the "eye" of a demodulated sequence of symbols becomes more collapsed, determining the original logic levels of the symbols becomes more susceptible to symbol decision error. Particularly at higher modulation orders, as in FIG. 7C, where distinguishing between more than two symbol levels at a time is based upon multiple thresholds, determining the original logic levels of symbols is difficult and prone to error As such, slicers in conventional GFSK receivers are susceptible to making erroneous symbol decisions, especially at low SNR. However, for the slicer 326 of the GFSK receiver 314, distinguishing between symbol levels for the sequence of symbols illustrated in FIG. 7D is not as prone to error.

The structure and operation of the digital filter 324 will now be additionally described with reference to FIG. 8.

Figure 8:
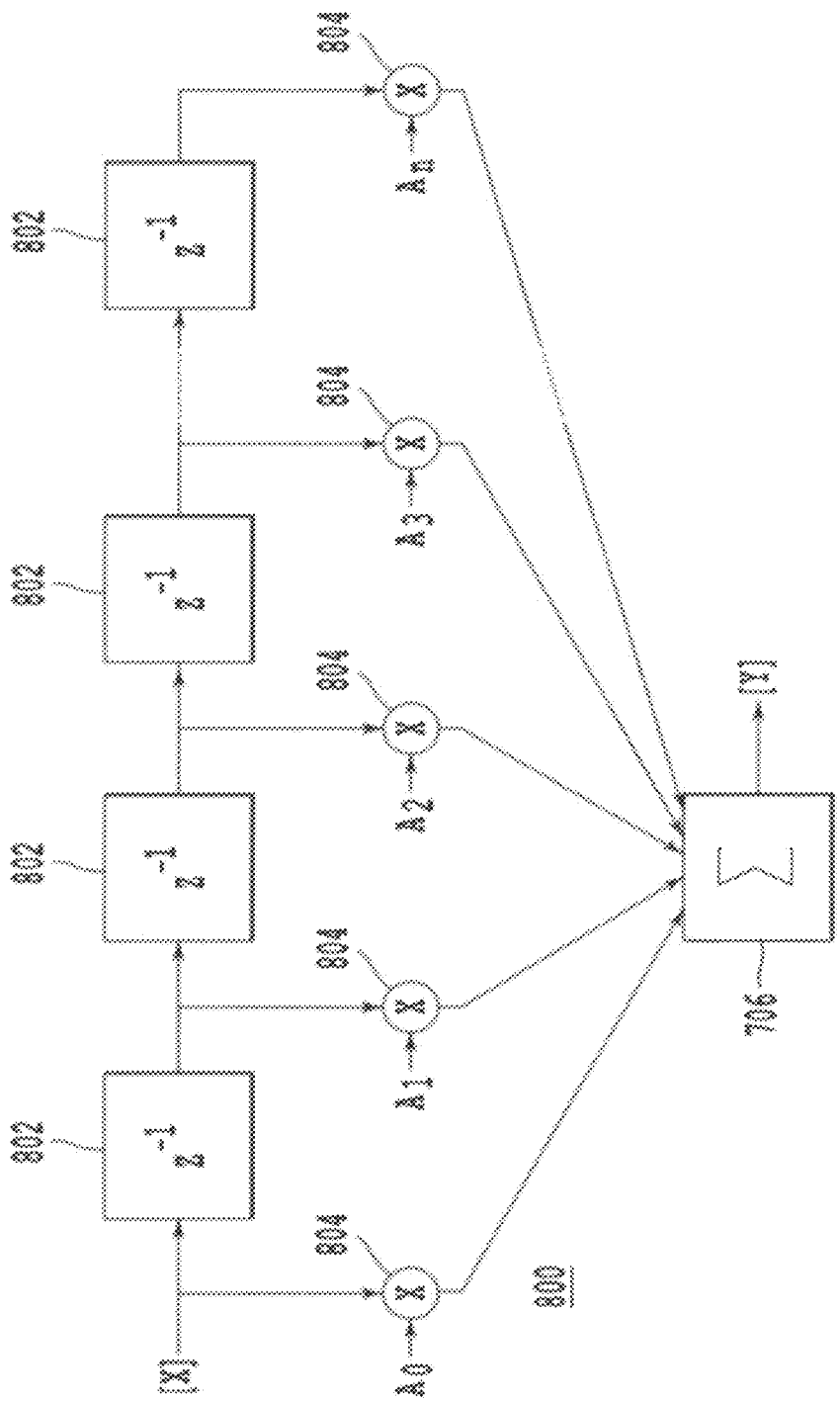
FIG. 8 is a block diagram illustrating a digital filter.

FIG. 8 illustrates a preferred embodiment of the digital filter 324, a constant coefficient finite impulse response (FIR) digital filter 800. Specifically, the FIR digital filter 800 of FIG. 8 includes a chain of delay units 802, a chain of multiplier units 804, and a summation unit 806. The FIR digital filter 800 may also be embodied by an FIR digital filter which varies in structure from that illustrated in FIG. 8 based on known structures of FIR digital filters.

The number of the delay units in the chain of delay units 802 and the number of multiplier units in the chain of multiplier units 804 are determined based upon at least one of the symbol rate of received symbols, the digital filter sampling frequency the BT product of the pulse shaping Gaussian filter 306, and the BT product of the channel filter 320. The digital filter sampling frequency, must be greater than or equal to the Nyquist sampling frequency, which is twice the bandwidth of the signal at the output of the FSK demodulator 322.

In operation of the FIR digital filter 800, a sequence of symbols, such as the sequence of symbols recovered by the FSK demodulator 322, are input to the chain of delay units 802. Each delay unit 802 and corresponding multiplier unit 804 comprises a weighting stage which weights a symbol of the input sequence of symbols by a respective filter coefficient. In FIG. 8, [X] represents an input sequence of symbols, such as the sequence of symbols recovered by the FSK demodulator 322. Each delay unit in the chain of delay units 802 stores a respective symbol of the input sequence of symbols, for one symbol period, and outputs the stored symbol to the next delay unit 802. As illustrated at FIG. 8, symbols are tapped before, between, and after each delay unit 802, for multiplication of the tapped symbols by respective filter coefficients $A_0$–$A_N$ at respective multipliers 804. The coefficients $A_0$–$A_N$ are determined as described above in association with FIG. 6. The output of each multiplier 804 is provided as input to the summation unit 806. The summation unit 806 sums the outputs of the multipliers 804 to produce one symbol of an output sequence of symbols, [Y], per symbol period T. The FIR digital filter 800 removes ISI among symbols of the input sequence of symbols [X], and the output sequence of symbols [Y] is substantially free from ISI.

Based upon the filter coefficients $A_0$–$A_N$, the digital filter 324 and the FIR digital filter 800 embody equalizing filters that effectively convert the impulse responses of pulse shaping Gaussian filters to a filters having a Nyquist impulse response. As illustrated at FIG. 6, the impulse response of a Nyquist filter is 0 for all nT, except for n=0 (n being an integer). Based on the Nyquist response, ISI may be substantially eliminated from a sequence of symbols filtered by a Nyquist filter. The digital filter 324 and the FIR digital filter 800 are designed to remove residual ISI from a received signal to 1 part in 1000 (i.e., 0.1%) or less.

Additionally, as described above with regard to FIG. 6, the digital filter 324 and the FIR digital filter 800 are further configured to perform post detection filtering based upon the filter coefficients $A_0$-$A_N$. The post detection filtering performed by the digital filter 324 and the FIR digital filter 800 is similar to that performed by the post detection filter 124.

The FIR digital filter 800 may be implemented entirely in hardware as a combination of hardware circuits. Alternatively, the FIR digital filter 800 may be implemented in software by a processor of a data processing apparatus executing computer readable instructions.

Figure 9:
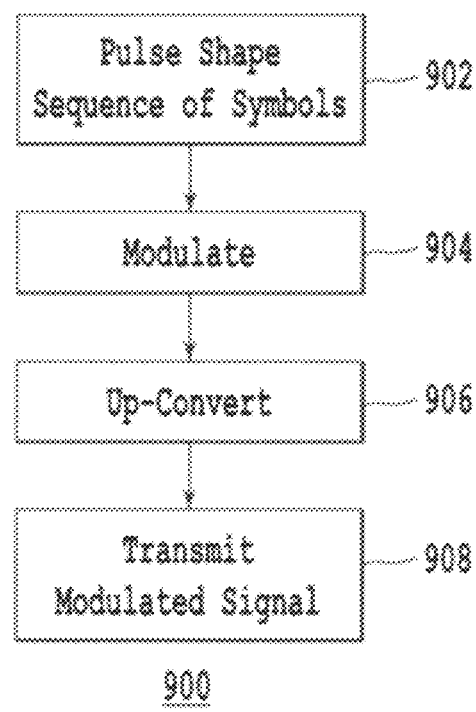
FIG. 9 is a flow chart illustrating a transmit method.

FIG. 9 is a flowchart illustrating a transmission method 900. The transmission method 900 includes pulse shaping of a sequence of symbols at 902, modulation at 904, up-conversion at 906, and transmission at 908.

To carry out the transmission method 900, a sequence of symbols provided by a data source, such as data source 304, is pulse shaped at 902. The pulse shaping at 902 may be realized by a pulse shaping Gaussian filter, such as the Gaussian filter 306, and step 902 induces ISI into the sequence of symbols. At 904, a frequency $f_0$ is modulated according to the pulse shaped sequence of symbols to generate a modulated signal. Modulation at 904 may be implemented by the FSK modulator 308. Up-conversion at 906 may be realized by a transmitter back end including an up-converter and amplifier, such as transmitter back end 310. Up-conversion at 906 up-converts the modulated signal to a frequency suitable for RF transmission. RF transmission may be implemented at 908 using a suitable transmission antenna.

Figure 10:
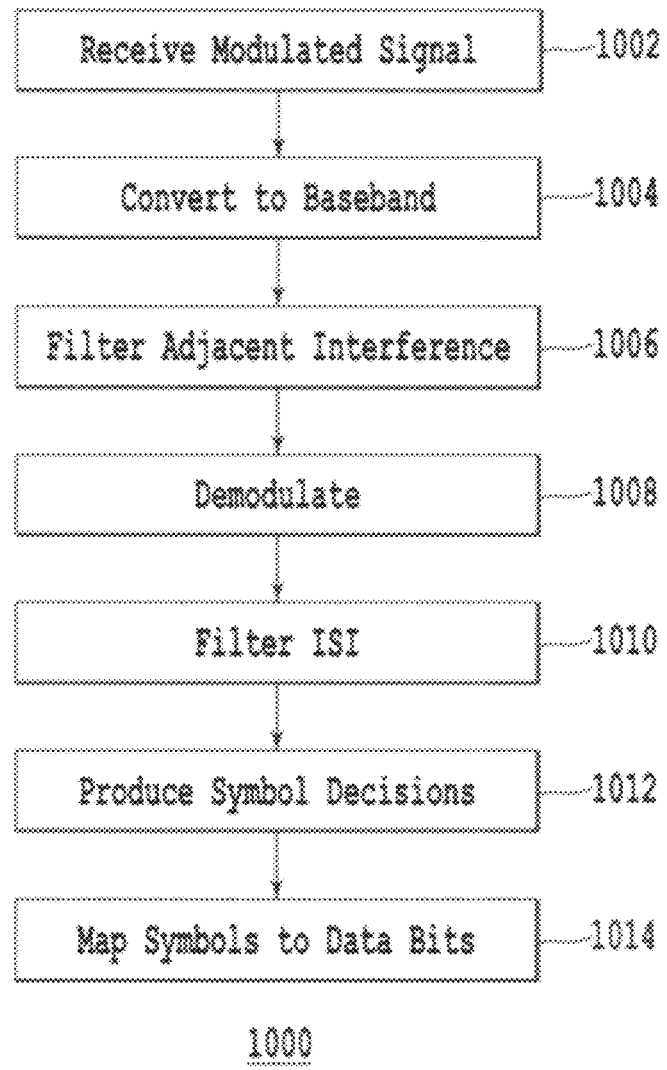
FIG. 10 is a flow chart illustrating a receive method.

FIG. 10 is a flowchart illustrating a receive method 1000. The receive method 1000 includes receiving a transmitted signal at 1002, down converting the received signal to a baseband modulated signal at 1004, filtering the baseband modulated signal to remove adjacent channel interference at 1006, demodulating the channel filtered baseband modulated signal to recover a sequence of symbols at 1008, filtering the sequence of symbols at 1010, producing symbol decisions based on the filtered sequence of symbols at 1012, and mapping the symbol decisions to data bits at 1014.

To carry out the receive method 1000, at 1002, a transmitted signal is received at an antenna, such as antenna 316. Down-conversion at 1004 is realized by, for example, the receiver front end 318, which down-converts the received signal to a baseband modulated signal. The removal of adjacent channel interference at 1006 is accomplished by a channel filter, which may induce ISI in addition to any ISI already present in the received signal. The removal of adjacent channel interference at 1006 may be accomplished by a channel filter such as the channel filter 320. Demodulation of the channel filtered baseband modulated signal at 1008 may be implemented by any suitable demodulator that provides an output proportional to the instantaneous frequency at its input, such as the frequency demodulator 322. A recovered sequence of symbols, including ISI among symbols of the sequence, is produced at 1008.

At 1010, the ISI present in the recovered sequence of symbols is substantially removed, providing an advantage as compared to the conventional techniques. Removal of the ISI at 1010 may be achieved by digital filters such as the digital filter 324, which is further detailed above as the FIR filter 800.

With the ISI removed by filtering at 1010, accurate symbol decisions may be made, substantially free from error even at low SNR, at 1012. For example, the slicer 326 may produce the symbol decisions at 1012 using a filtered sequence of symbols which are substantially free from ISI. At 1014, data bits may be recovered by mapping the symbol decisions produced at 1012 using the symbol to bit mapper 328.

Figure 11:
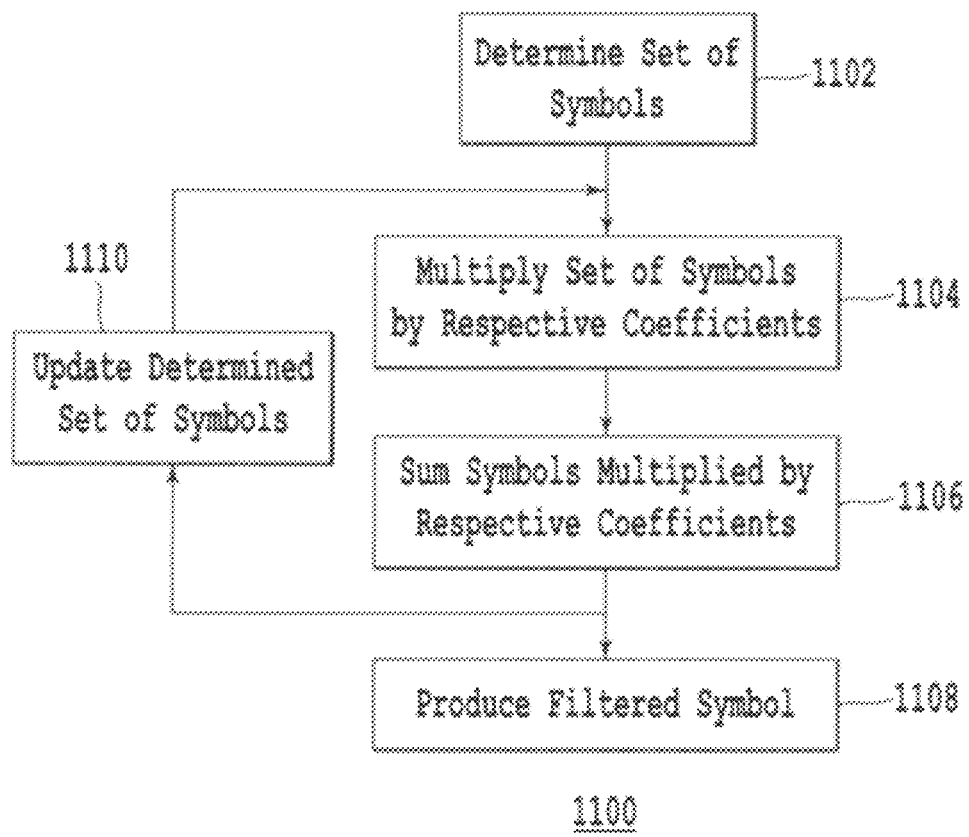
FIG. 11 is a flow chart illustrating a digital filter method.

FIG. 11 is a flowchart illustrating a digital filter method 1100. According to the digital filter method 1100, a sequence of symbols is filtered. Specifically, a set of symbols of the sequence of symbols is determined at 1102, and each of the symbols of the determined set of symbols are multiplied by a respective filter coefficient at 1104. Each of the symbols of the determined set of symbols, multiplied by its respective filter coefficient, is summed at 1106 to produce a first filtered symbol. The filtered symbol is output at 1108. Then, the determined set of symbols is updated by shifting at step 1110. For example, the determined set of symbols may be updated by one symbol based upon a first-in-last-out symbol delay chain, such as the chain of delay units 802. After updating, the determined set of symbols is multiplied by filter coefficients at 1104 and summed again at 1106. Thus, a second filtered symbol is output at 1108 based upon the update of the determined set of symbols at 1110. As illustrated at FIG. 11, the digital filter method 1100 is iterative, and it produces a filtered output sequence of symbols. Multiplication at 1104 may be implemented by the multiplier units 804, and summation at 1106 may be implemented by the summation unit 806, for example. The respective coefficients of the digital filter method 1000 may be the filter coefficients $A_0$-$A_N$.

Although described with reference to the GFSK communication system 300, the methods 900, 1000, and 1100 may be performed using transmitter and receiver hardware circuits understood in the art to be equivalent to those described with regard to the GFSK communication system 300. Further, the methods 800, 900, and 1000 may be performed using hardware, software, or combinations of hardware and software. For example, the receive method 1000 may be carried out, in whole or in part, by a processor of a data processing apparatus processing in accordance with a set of computer readable instructions, as described in additional detail below with reference to FIG. 12.

In accordance with embodiments implemented using a data processing apparatus executing computer readable instructions, the computer readable instructions are stored on a computer readable storage medium, that, when executed by a processor, configure and direct the processor and/or the processing apparatus to perform features of the GFSK transmitter 300, the GFSK receiver 314, the operation 600, and the methods 900, 1000, and 1100. Non-limiting examples of the computer readable storage medium include random access memories (RAMs), read-only memories (ROMs), optical discs (CDs) (DVDs), and magnetic storage mediums.

Figure 12:
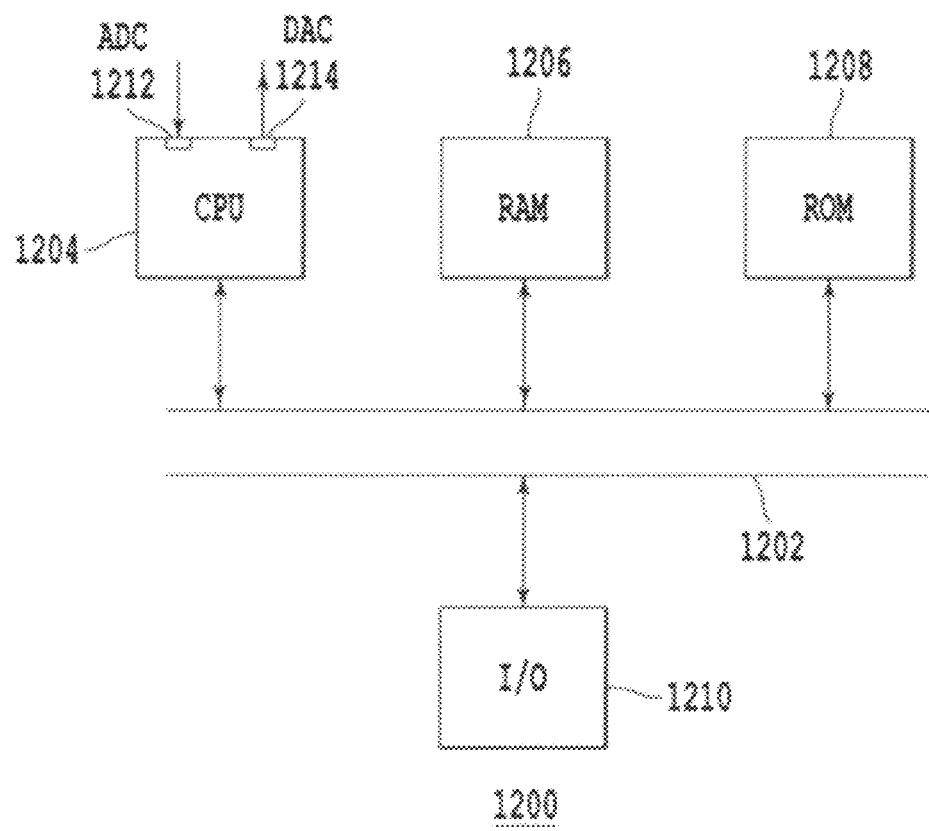
FIG. 12 is a schematic block diagram illustrating a data processing apparatus embodiment.

FIG. 12 illustrates a data processing apparatus embodiment 1200. The data processing apparatus 1200 includes a system bus 1202, a processor 1204, a RAM 1206, a ROM 1208, and a data input/output interface 1210. In some embodiments, the processor 1204 includes an integrated ADC 1212 and/or an integrated DAC 1214. Alternatively, the ADC 1212 and the DAC 1214 may be separate from the processor 1204 and coupled to the processor 1204 via the data bus 1202 and/or the input/output interface 1210.

In operation, computer readable program instructions are loaded from at least one of the RAM 1206, the ROM 1208, and other storage mediums (not illustrated) into the processor 1204 for execution. When executed by the processor 1204, the computer readable program instructions configure and direct the processor 1204 to perform features of the GFSK transmitter 300, the GFSK receiver 314, the operation 600, and the methods 900, 1000, and 1100. Additionally, to facilitate the implementation of the receive method 1000 by the data processing apparatus, a received modulated signal may be converted to a received modulated digital signal using the ADC 1212, so that the processor 1204 is able to operate upon a digital copy of the received modulated signal. Further, along with processing of the transmit method 900 by the data processing apparatus, a modulated digital signal may be converted by the DAC 1214 to an analog modulated signal, for transmission as an analog modulated signal.

The processor 1204 may include a general purpose Central Processing Unit (CPU), a Digital Signal Processor (DSP), a Field Programmable Gate Array (FPGA), or an Application Specific Integrated Circuit (ASIC).

Variations of the communications receiver and the communications receiver method are possible in light of the above description. Thus, the communications receiver and the communications receiver method may be practiced other than as specifically described above, based on art recognized equivalents understood by those having skill in the art.

The invention claimed is:

1. A communications receiver, comprising:
a receiver front end to receive a modulated signal and convert the modulated signal to a baseband modulated signal;
a channel filter to reduce channel interference which is adjacent to a desired channel of the baseband modulated signal from the baseband modulated signal and to produce a channel filtered baseband modulated signal;
a demodulator to demodulate the channel filtered baseband modulated signal and to recover a sequence of symbols;
a digital filter having at least one filter coefficient derived from an impulse response of a Gaussian filter to reduce inter-symbol interference (ISI) from the sequence of symbols;
a slicer to produce symbol decisions based on the filtered sequence of symbols; and
a symbol-to-bit mapper to map the symbol decisions to data bits.

2. The communications receiver of claim 1, wherein the communications receiver comprises a Gaussian Frequency Shift Key (GFSK) receiver.

3. The communications receiver of claim 1, wherein the digital filter comprises a Nyquist equalizing filter which reduces ISI from the sequence of symbols based on a Nyquist response.

4. The communications receiver of claim 1, wherein the digital filter comprises a plurality of weighting stages, each weighting stage to weight a symbol of the sequence of symbols by a respective filter coefficient based on the impulse response of the Gaussian filter.

5. The communications receiver of claim 1, wherein the digital filter comprises a plurality of weighting stages, each weighting stage to weight a symbol of the sequence of symbols by a respective filter coefficient based on an aggregate of a determined impulse response of the Gaussian filter and a determined impulse response of the channel filter.

6. The communications receiver of claim 1, wherein the digital filter comprises a plurality of weighting stages, each weighting stage to weight a symbol of the sequence of symbols by a respective filter coefficient based on a determined impulse response of a Nyquist filter divided by an aggregate response of a determined impulse response of the Gaussian filter and a determined impulse response of the channel filter.

7. The communications receiver of claim 6, wherein
a comparator compares each frequency component of the aggregate response to a predetermined real number and, when a frequency component of the aggregate response is less than the predetermined real number, replaces the frequency component by the predetermined real number, to produce a modified aggregate response, and
a divider divides the determined impulse response of the Nyquist filter by the modified aggregate response to determine the respective filtering coefficients.

8. The communications receiver of claim 6, wherein
the Gaussian filter has a half-bandwidth to symbol rate ratio (BT) of 0.36 or lower, and
the channel filter has a half-bandwidth to symbol rate ratio (BT) of less than 0.75.

9. A communications receiver, comprising:
a receiver front end to receive a modulated signal and convert the modulated signal to a baseband modulated signal;
a channel filter to reduce channel interference which is adjacent to a desired channel of the baseband modulated signal from the baseband modulated signal and to produce a channel filtered baseband modulated signal;
a demodulator to demodulate the channel filtered baseband modulated signal and to recover a sequence of symbols;
a digital filter to reduce inter-symbol interference (ISI) from the sequence of symbols;
a slicer to produce symbol decisions based on the filtered sequence of symbols; and
a symbol-to-bit mapper to map the symbol decisions to data bits, wherein
the digital filter comprises a plurality of weighting stages, each weighting stage to weight a symbol of the sequence of symbols by a respective filter coefficient based on an aggregate of a determined impulse response of the digital communications receiver and a determined impulse response of a transmitter of the modulated signal.

10. A communications receiver method, comprising:
receiving a modulated signal and converting the modulated signal to a baseband modulated signal;
filtering channel interference which is adjacent to a desired channel of the baseband modulated signal to reduce the channel interference from the baseband modulated signal and to produce a channel filtered baseband modulated signal;
demodulating the channel filtered baseband modulated signal to recover a sequence of symbols;
filtering, by a processor of a data processing apparatus using at least one filter coefficient derived from an impulse response of a Gaussian filter, the sequence of symbols to reduce inter-symbol interference (ISI) from the sequence of symbols;
producing symbol decisions based on the filtered sequence of symbols; and
mapping the symbol decisions to data bits.

11. The communications receiver method of claim 10, wherein the filtering the sequence of symbols to reduce ISI comprises:
determining the impulse response of the Gaussian filter,
determining a plurality of filter coefficients based on the impulse response of the Gaussian filter, and
filtering the sequence of symbols to reduce ISI based on the plurality of filter coefficients.

12. The communications receiver method of claim 10, wherein the filtering the sequence of symbols to reduce ISI comprises:
   determining the impulse response of a Gaussian filter,
   determining an impulse response of the filtering channel interference,
   aggregating the impulse response of the Gaussian filter and the impulse response of the filtering channel interference, to produce an aggregate response,
   determining a plurality of filter coefficients based on the aggregate response, and
   filtering the sequence of symbols to reduce ISI based on the plurality of filter coefficients.

13. The communications receiver method of claim 10, wherein the filtering the sequence of symbols to reduce ISI comprises:
   determining the impulse response of the Gaussian filter,
   determining an impulse response of the filtering channel interference,
   aggregating the impulse response of the Gaussian filter and the impulse response of the filtering channel interference, to produce an aggregate response,
   determining an impulse response of a Nyquist filter,
   dividing the impulse response of the Nyquist filter by the aggregate response, to produce a quotient,
   determining a plurality of filter coefficients based on the quotient, and
   filtering the sequence of symbols to reduce ISI based on the plurality of filter coefficients.

14. The communications receiver method of claim 13, wherein
   the Gaussian filter has a half-bandwidth to symbol rate ratio (BT) of 0.36 or lower, and
   the filtering channel interference has a half-bandwidth to symbol rate ratio (BT) of less than 0.75.

15. The communications receiver method of claim 13, wherein the aggregating the impulse response of the Gaussian filter and the impulse response of the filtering channel interference comprises:
   determining an impulse response of a frequency modulator,
   determining an impulse response of the converting the modulated signal to a baseband signal, and
   aggregating the impulse response of the Gaussian filter, the impulse response of the filtering channel interference, the impulse response of the frequency modulator, and the impulse response of the converting the modulated signal to a baseband signal, to produce the aggregate response.

16. The communications receiver method of claim 10, wherein the filtering the sequence of symbols to reduce ISI comprises:
   determining the impulse response of a Gaussian filter;
   determining an impulse response of the filtering channel interference;
   aggregating the impulse response of the Gaussian filter and the impulse response of the filtering channel interference, to produce an aggregate response;
   transforming the aggregate response into the frequency domain, to output a plurality of frequency bins;
   replacing ones of the plurality of frequency bins having a magnitude less than a predetermined value with the predetermined value, to produce a modified frequency domain aggregate response;
   determining an impulse response of a Nyquist filter;
   transforming the impulse response of the Nyquist filter into the frequency domain, to output a Nyquist frequency domain response;
   dividing the Nyquist frequency domain response by the modified frequency domain aggregate response, to produce a quotient;
   determining a plurality of filter coefficients based on the quotient; and
   filtering the sequence of symbols to reduce ISI based on the plurality of filter coefficients.

17. A communications receiver method, comprising:
   receiving a modulated signal and converting the modulated signal to a baseband modulated signal;
   filtering channel interference which is adjacent to a desired channel of the baseband modulated signal to reduce the channel interference from the baseband modulated signal and to produce a channel filtered baseband modulated signal;
   demodulating the channel filtered baseband modulated signal to recover a sequence of symbols;
   filtering, by a processor of a data processing apparatus, the sequence of symbols to reduce inter-symbol interference (ISI) from the sequence of symbols;
   producing symbol decisions based on the filtered sequence of symbols; and
   mapping the symbol decisions to data bits, wherein the filtering the sequence of symbols to reduce ISI comprises:
      determining an impulse response of a Nyquist filter,
      determining a plurality of filter coefficients based on the impulse response of the Nyquist filter; and
      filtering the sequence of symbols to reduce ISI based on the plurality of filter coefficients.

18. A non-transitory computer readable storage medium storing computer readable instructions which, when executed by a processor of a communications receiver, cause the processor to perform:
   receiving a modulated signal and converting the modulated signal to a baseband modulated signal;
   filtering channel interference which is adjacent to a desired channel of the baseband modulated signal to reduce the channel interference from the baseband modulated signal and to produce a channel filtered baseband modulated signal;
   demodulating the channel filtered baseband modulated signal to recover a sequence of symbols;
   filtering, using at least one filter coefficient derived from an impulse response of a Gaussian filter, the sequence of symbols to reduce inter-symbol interference (ISI) from the sequence of symbols;
   producing symbol decisions based on the filtered sequence of symbols; and
   mapping the symbol decisions to data bits.

19. The computer readable storage medium of claim 18, wherein the filtering the sequence of symbols comprises:
   determining the impulse response of the Gaussian filter;
   determining a plurality of filter coefficients based on the impulse response of the Gaussian filter; and
   filtering the sequence of symbols to reduce ISI based on the plurality of filter coefficients.

20. The computer readable storage medium of claim 18, wherein the filtering the sequence of symbols comprises:
   determining the impulse response of a Gaussian filter;
   determining an impulse response of the filtering channel interference;

aggregating the impulse response of the Gaussian filter and the impulse response of the filtering channel interference to produce an aggregate response;

determining a plurality of filter coefficients based on the aggregate response; and filtering the sequence of symbols to reduce ISI based on the plurality of filter coefficients.

21. The computer readable storage medium of claim 18, wherein the filtering the sequence of symbols comprises:

determining an impulse response of a Nyquist filter;

determining the impulse response of the Gaussian filter;

dividing the impulse response of the Nyquist filter by the impulse response of the Gaussian filter, to produce a quotient;

determining a plurality of filter coefficients based on the quotient; and filtering the sequence of symbols to reduce ISI based on the plurality of filter coefficients.

22. A non-transitory computer readable storage medium storing computer readable instructions which, when executed by a processor of a communications receiver, cause the processor to perform:

receiving a modulated signal and converting the modulated signal to a baseband modulated signal;

filtering channel interference which is adjacent to a desired channel of the baseband modulated signal to reduce the channel interference from the baseband modulated signal and to produce a channel filtered baseband modulated signal;

demodulating the channel filtered baseband modulated signal to recover a sequence of symbols;

filtering the sequence of symbols to reduce inter-symbol interference (ISI) from the sequence of symbols;

producing symbol decisions based on the filtered sequence of symbols; and mapping the symbol decisions to data bits, wherein the filtering the sequence of symbols to reduce ISI comprises:

determining an impulse response of a Nyquist filter, determining a plurality of filter coefficients based on the impulse response of the Nyquist filter, and filtering the sequence of symbols to reduce ISI based on the plurality of filter coefficients.

* * * * *

UNITED STATES PATENT AND TRADEMARK OFFICE
CERTIFICATE OF CORRECTION

| | |
|---|---|
| PATENT NO. | : 8,625,722 B2 |
| APPLICATION NO. | : 12/847951 |
| DATED | : January 7, 2014 |
| INVENTOR(S) | : Robert E. Rouquette |

It is certified that error appears in the above-identified patent and that said Letters Patent is hereby corrected as shown below:

In the Specification

Column 12, line 36, change "frequency" to -- frequency $f_s$, --.

Column 12, line 38, change "frequency" to -- frequency, $f_s$ --.

Signed and Sealed this
Twenty-second Day of July, 2014

Michelle K. Lee
*Deputy Director of the United States Patent and Trademark Office*